United States Patent
Kim et al.

(10) Patent No.: US 9,917,522 B2
(45) Date of Patent: Mar. 13, 2018

(54) POWER CONTROL APPARATUS FOR SUB-MODULE OF MMC CONVERTER

(71) Applicant: HYOSUNG CORPORATION, Seoul (KR)

(72) Inventors: June-Sung Kim, Anyang-si (KR); Hong-Ju Jung, Seoul (KR); Jung-Soo Park, Uiwang-si (KR); Doo-Young Lee, Anyang-si (KR); Jong-Yun Choi, Hwaseong-si (KR)

(73) Assignee: HYOSUNG CORPORATION, Seoul (KR)

( * ) Notice: Subject to any disclaimer, the term of this patent is extended or adjusted under 35 U.S.C. 154(b) by 0 days.

(21) Appl. No.: 15/538,129

(22) PCT Filed: Dec. 28, 2015

(86) PCT No.: PCT/KR2015/014360
§ 371 (c)(1),
(2) Date: Jun. 20, 2017

(87) PCT Pub. No.: WO2016/108552
PCT Pub. Date: Jul. 7, 2016

(65) Prior Publication Data
US 2017/0346407 A1    Nov. 30, 2017

(30) Foreign Application Priority Data
Dec. 29, 2014  (KR) .......................... 10-2014-0192745

(51) Int. Cl.
*H02M 3/335* (2006.01)
*H02J 1/10* (2006.01)
(Continued)

(52) U.S. Cl.
CPC ......... *H02M 3/33523* (2013.01); *H02M 1/08* (2013.01); *H02M 3/3353* (2013.01)

(58) Field of Classification Search
CPC ....... H02M 1/4241; H02M 2007/4815; H02M 7/517; H02M 7/5375; H02M 7/53875
(Continued)

(56) References Cited

U.S. PATENT DOCUMENTS 6,246,592 B1 * 6/2001 Balogh ............. H02M 3/33592
                                                  363/16
8,305,775 B2 * 11/2012 Shimada ................. H02M 1/36
                                                 363/21.02
(Continued)

FOREIGN PATENT DOCUMENTS

EP       2765696 A1    8/2014
JP       07-077513 B2  8/1995
(Continued)

*Primary Examiner* — Gary Nash
(74) *Attorney, Agent, or Firm* — Novick, Kim & Lee, PLLC; Jae Youn Kim

(57) ABSTRACT

The present invention relates to a power control apparatus for sub-modules in a Modular Multilevel Converter (MMC), which controls the supply of power to sub-modules in an MMC connected to an HVDC system and to a STATCOM. The power control apparatus includes a half-bridge circuit unit for switching multiple switches, converting an input voltage across P and N buses of the MMC into a relatively low voltage, and outputting the low voltage; a transformer for transferring the low output voltage (primary side), output through switching of the switches in the half-bridge circuit unit via switching of the switches, to a secondary side of the transformer; a DC/DC converter for converting an output voltage on the secondary side of the transformer; a photocoupler for outputting a reference signal corresponding to a magnitude of the secondary side output voltage of the transformer; a Pulse Width Modulation (PWM) control unit for controlling switching of the switches in the half-bridge circuit unit in response to the reference signal output from the photocoupler; and a starting circuit unit for supplying an
(Continued)

initial starting voltage to the PWM control unit, wherein the PWM control unit is started in response to the starting voltage initially supplied from the starting circuit unit, and is configured to control switching of the switches in response to the reference voltage received from the photocoupler, and to receive the secondary side output voltage of the transformer as an operating voltage depending on the switching, thus being operated.

7 Claims, 7 Drawing Sheets

(51) Int. Cl.
  *H02M 5/42*     (2006.01)
  *H02M 7/68*     (2006.01)
  *H02M 3/24*     (2006.01)
  *H02M 7/44*     (2006.01)
  *H02M 1/08*     (2006.01)

(58) Field of Classification Search
  USPC ........ 323/901; 363/21.02, 21.03, 65, 78, 97, 363/98
  See application file for complete search history.

(56) References Cited

U.S. PATENT DOCUMENTS

| | | | |
|---|---|---|---|
| 8,385,086 B2* | 2/2013 | Hiller | H02M 5/458 363/131 |
| 2011/0157920 A1* | 6/2011 | Adragna | H02M 3/3376 363/21.03 |
| 2012/0212981 A1 | 8/2012 | Lin | |
| 2012/0250360 A1* | 10/2012 | Orr | H02M 3/3376 363/21.02 |
| 2013/0279211 A1* | 10/2013 | Green | H02M 7/49 363/35 |

FOREIGN PATENT DOCUMENTS

| | | |
|---|---|---|
| JP | 2011-114920 A | 6/2011 |
| JP | 2013-255422 A | 12/2013 |
| JP | 2014-180110 A | 9/2014 |
| KR | 10-2014-0087450 A | 7/2014 |
| WO | 2014-091801 A1 | 6/2014 |

\* cited by examiner

-PRIOR ART-

-PRIOR ART-

POWER CONTROL APPARATUS FOR SUB-MODULE OF MMC CONVERTER

TECHNICAL FIELD

The present invention generally relates to a power control apparatus and, more particularly, to a power control apparatus for sub-module of a Modular Multilevel Converter (MMC), which controls the stable supply of power to sub-modules in an MMC connected to a High Voltage Direct Current (HVDC) system and to a Static Synchronous Compensator (STATCOM).

Background Art

Generally, in High Voltage Direct Current (HVDC) systems, Alternating Current (AC) power produced in a power plant is converted into DC power and the DC power is transmitted, and a power receiving stage re-converts the DC power into AC power and supplies the AC power to a load. Such an HVDC system is advantageous in that power may be efficiently and economically transmitted via voltage boosting, and in that connections between heterogeneous systems and long-distance high-efficiency power transmission are possible. Further, a Static Synchronous Compensator (STATCOM) is a kind of Flexible AC Transmission System (FACTS) device, and denotes an electric power electronics-based compensator, which is connected to a power system and is used to increase power transmission capacity and to maximize the usage of existing facilities. Such a STATCOM system is advantageous in that power systems are compensated in parallel using a voltage-type power semiconductor device, thus stabilizing the systems by maintaining voltage at a constant value.

An MMC may be connected to an HVDC or STATCOM system. In such an MMC, multiple sub-modules are connected in series. In the MMC, a sub-module is one of the most important components. Therefore, in order for sub-modules to operate normally in various environments, there is a need to stably supply power to the sub-modules. Further, in the MMC, sub-modules become a current path through which voltage is converted and power is transmitted. Since loss occurring during the operation of sub-modules negatively influences the efficient operation of the sub-modules, efforts to minimize such loss have been continuously made.

FIG. 1 is an equivalent circuit diagram of an MMC, and FIG. 2 is a circuit diagram of a conventional power control apparatus for MMC sub-modules. As is well-known to those skilled in the art, an MMC is composed of one or more phase modules 1, and individual sub-modules 10 are connected in series in each phase module 1. Further, DC voltage terminals of each of the phase modules 1 are connected to positive (+) and negative (−) DC voltage buses P and N, respectively. A high DC voltage is present between the DC voltage P and N buses. In each sub-module 10, two connection terminals X1 and X2 are formed.

A conventional power control apparatus 20 for MMC sub-modules converts a high voltage (about 2 to 3 kV) on the P and N buses into a low voltage (about 300 to 400 V) so as to supply the power required to operate the sub-modules. Here, in order to maintain high reliability depending on the characteristics of the HVDC system, the coupling of resistors R and a Zener diode Z is used. For example, current is limited using specific resistors R1 and R2, among multiple resistors R1 to R3 connected in series between the P and N buses, and the high voltage is converted into the low voltage using the Zener diode Z.

However, the conventional power control apparatus 20 is problematic in that loss occurs due to heat generated in the resistors R1 and R2 for current limiting, and such heat generation may negatively influence the overall operation of the power control apparatus because it is closely related to the reliability of elements. Thus, there is inconvenience in that a heat dissipation plate for preventing heat generation must be separately attached.

Further, the sub-modules of the MMC connected to the HVDC system accommodate voltages falling within a very wide range (0 to 3 kV), and must drive the MMC by combining the voltages, and thus the power of the sub-modules must be normally supplied at a voltage of 800 V or less. For this reason, if current-limiting resistors R1 and R2 are selected so that the control power is normally output in a range of 800 V, and the input voltage is increased up to 3 kV, high current flows through the resistors R1 and R2, thus increasing loss and resulting in heat generation.

At the same time, most of the increased current flows into the Zener diode Z, so that high heat is generated in the Zener diode Z, thus greatly deteriorating the reliability of the apparatus. The reason for this is that the resistance of the Zener diode Z is lower than the line resistance of the resistor R3.

In the case of the current-limiting resistors R1 and R2, heat dissipation may be smoothly performed using a heat dissipation plate, but, in the case of the Zener diode Z, a problem arises in that it is difficult to attach a heat dissipation plate or the like, for the reason of increased volume or the like.

Therefore, in the field of this art, there is required the development of technology for a power control apparatus, which enables power control to be stably performed while minimizing the loss of current-limiting resistors without requiring the installation of additional elements in the sub-modules of an MMC connected to an HVDC system.

DISCLOSURE

Technical Problem

An object of the present invention is to provide a power control apparatus for sub-module of an MMC converter, which prevents the generation of heat in internal elements and minimizes loss in the elements when the MMC, connected to an HVDC and to a STATCOM, converts a high voltage into a low voltage and supplies the low voltage to the sub-modules in the MMC converter.

Technical Solution

A power control apparatus for sub-modules in a Modular Multilevel Converter (MMC) according to the present invention includes a half-bridge circuit unit for switching multiple switches, converting an input voltage across P and N buses of the MMC into a relatively low voltage, and outputting the low voltage; a transformer for transferring the low output voltage (primary side), output through switching of the switches in the half-bridge circuit unit via switching of the switches, to a secondary side of the transformer; a DC/DC converter for converting an output voltage on the secondary side of the transformer; a photocoupler for outputting a reference signal corresponding to a magnitude of the secondary side output voltage of the transformer; a Pulse Width Modulation (PWM) control unit for controlling switching of the switches in the half-bridge circuit unit in response to the reference signal output from the photocoupler; and a starting circuit unit for supplying an initial starting voltage to the PWM control unit, wherein the PWM control unit is started in response to the starting voltage initially supplied from the starting circuit unit, and is configured to control switching of the switches in response to the reference voltage received from the photocoupler, and to receive the secondary side output voltage of the transformer as an operating voltage depending on the switching, thus being operated.

In the present invention, the input voltage may increase from 0 V to a preset maximum voltage (Vmax).

In the present invention, the starting circuit unit may be configured to, when the input voltage initially increases and reaches a preset starting voltage of the PWM control unit, supply the starting voltage to the PWM control unit, and when the secondary side output voltage of the transformer is normally output as a preset voltage, receive the secondary side output voltage and block a supply of power to the PWM control unit.

In the present invention, the starting circuit unit may include a B contact switch configured to allow current corresponding to the input voltage to flow therethrough or to block the flow of the current; a resistor connected in series with the B contact switch and configured to limit a magnitude of the current; a voltage-drop diode connected in series with the resistor and configured to, when a voltage higher than the preset voltage is induced, allow the current to flow through the voltage-drop diode; and a Zener diode connected in series with the voltage-drop diode and configured to apply a constant voltage to the PWM control unit.

In the present invention, the B contact switch may be maintained in a shorted state until the input voltage reaches the preset starting voltage, and is switched to an opened state when the secondary side output voltage of the transformer is applied.

In the present invention, the power control apparatus may further include a current-limiting circuit for preventing current equal to or higher than a preset reference current from being applied to the half-bridge circuit unit.

In the present invention, the PWM control unit may calculate a switching duty ratio of the switches using the secondary side output voltage and an output current and varies a width of a switching pulse for the switches depending on the calculated switching duty ratio.

Advantageous Effects

According to the present invention, loss occurring in various types of internal elements in the power control apparatus for sub-modules in an MMC may be minimized, and the generation of heat may be prevented, and thus there is no need to attach an additional device such as a heat dissipation plate.

Further, according to the present invention, control power may be output even at 500 to 700 V, compared to the conventional power control apparatus which can output control power at 800 V.

Furthermore, according to the present invention, efficiency much higher than that of the conventional power control apparatus which use voltage-dividing resistors and a Zener diode may be maintained.

BEST MODE

Figure 1:
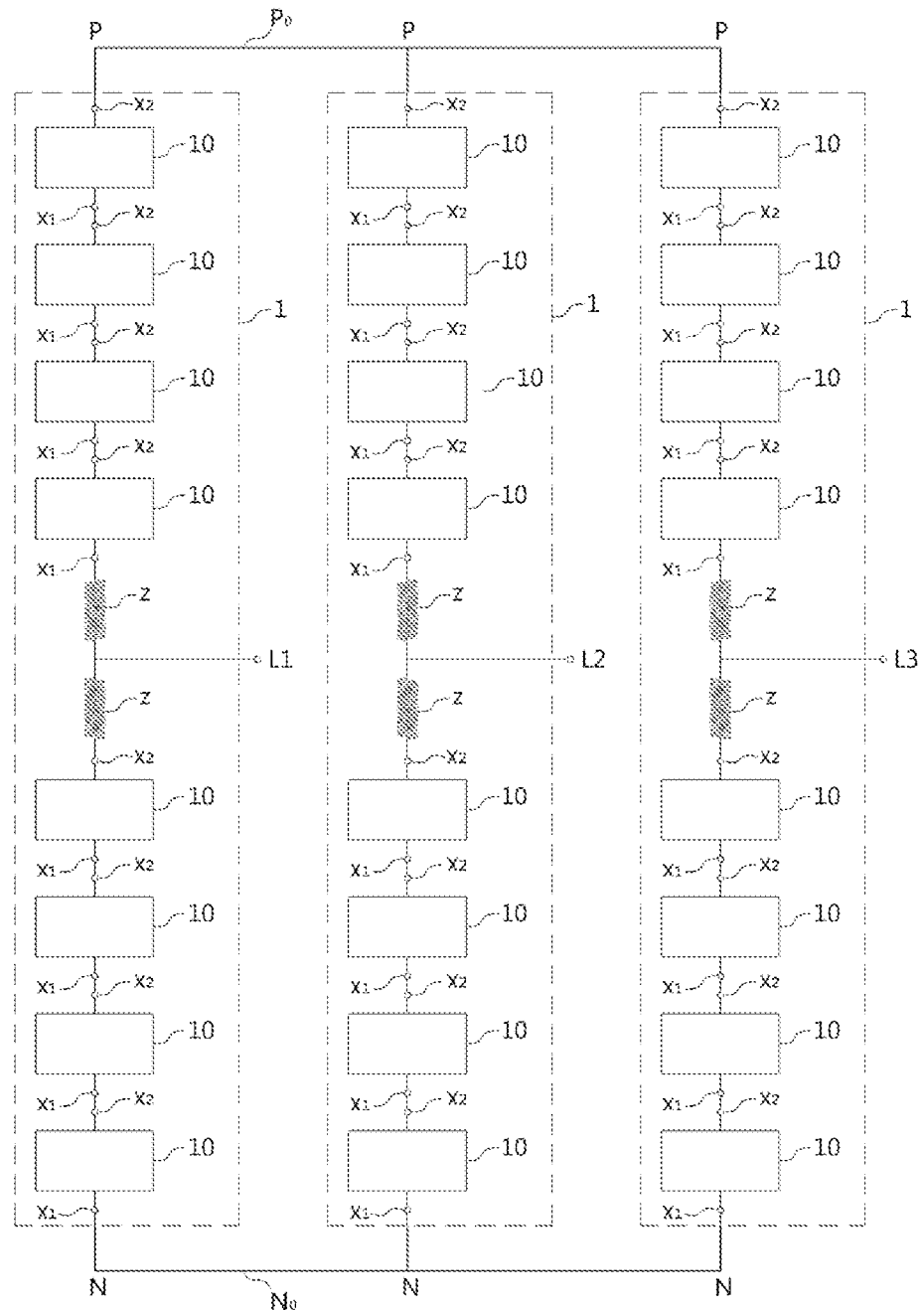
FIG. 1 is an equivalent circuit diagram of a typical MMC.
Figure 2:
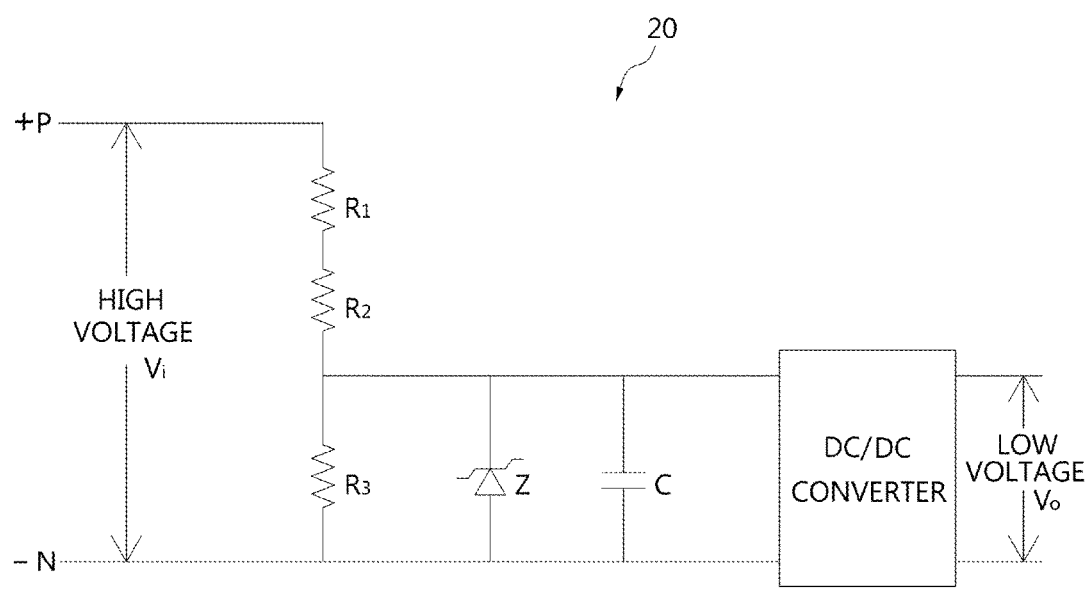
FIG. 2 is a circuit diagram showing a conventional power control apparatus for sub-module of an MMC converter.

Embodiments of the present invention are described with reference to the accompanying drawings in order to describe the present invention in detail so that those having ordinary knowledge in the technical field to which the present invention pertains can easily practice the present invention. It should be noted that the same reference numerals are used to designate the same or similar elements throughout the drawings. In the following description of the present invention, detailed descriptions of known functions and configurations which are deemed to make the gist of the present invention obscure will be omitted.

Further, terms such as "first", "second", "A", "B", "(a)", and "(b)" may be used to describe the components of the present invention. These terms are merely used to distinguish relevant components from other components, and the substance, sequence or order of the relevant components is not limited by the terms. It should be understood that a representation indicating that a first component is "linked", "coupled", or "connected" to a second component includes not only the case where the first component is directly coupled or connected to the second component but also cases where a third component is "linked", "coupled" or "connected" between the first and second components.

Figure 3:
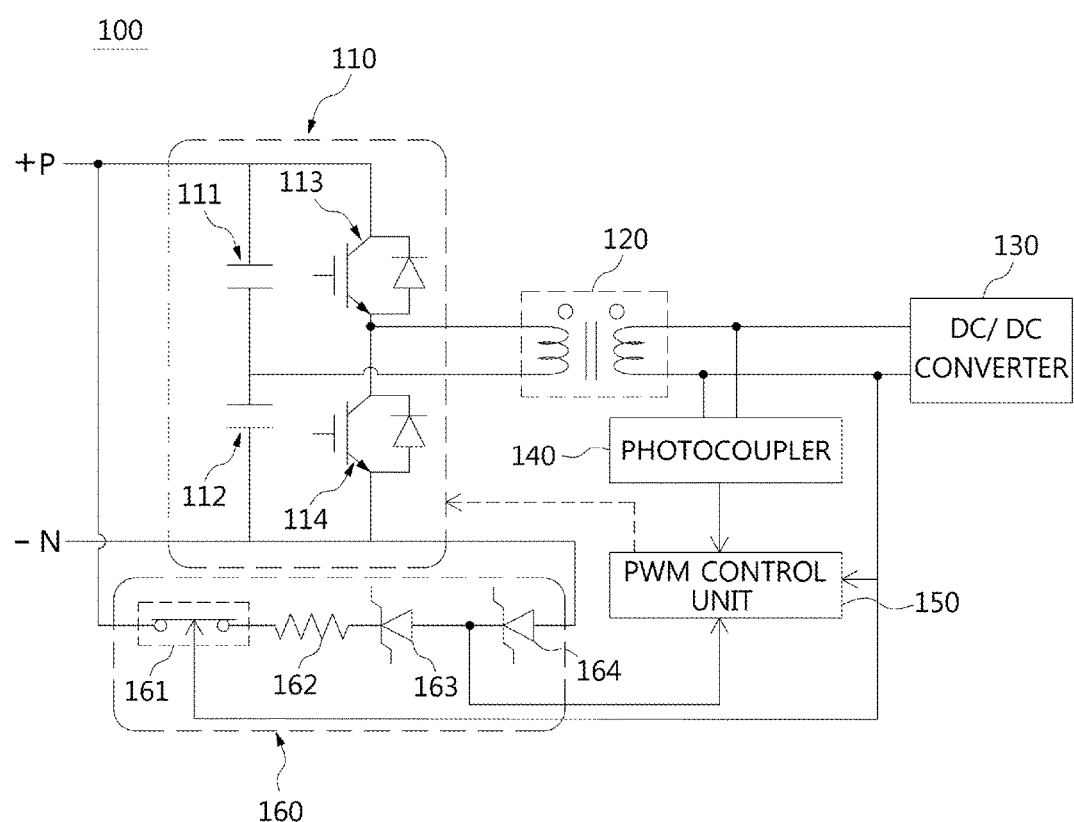
FIG. 3 is a circuit diagram showing a power control apparatus for sub-modules in an MMC converter according to a first embodiment of the present invention.

FIG. 3 is a circuit diagram showing a power control apparatus for sub-modules in an MMC converter according to an embodiment of the present invention.

Referring to FIG. 3, a power control apparatus 100 for MMC sub-modules according to the embodiment of the present invention is applied to an MMC having one or more phase modules. More specifically, power is supplied to multiple sub-modules constituting each phase module in the MMC. For this, the power control apparatus 100 according to the present invention receives a high voltage across positive (+) P and negative (−) N buses, to which each phase module is connected, converts the high voltage into a low voltage required for the operation of the sub-modules, and supplies the low voltage. Such an MMC is connected both to an HVDC system and to a STATCOM.

The power control apparatus 100 according to the embodiment of the present invention includes a half-bridge circuit unit 110, a transformer 120, a DC/DC converter 130, a photocoupler 140, a Pulse Width Modulation (PWM) control unit 150, and a starting circuit unit 160.

The half-bridge circuit unit 110 may receive an input voltage across the P and N buses of the MMC and perform switching at a voltage magnitude of ½ of the input voltage, which is relatively low. The half-bridge circuit unit 110 includes a first capacitor 111a connected between the P and N buses and a second capacitor 112 connected in series with the first capacitor 111, and series-connected first and second switches 113 and 114 connected in parallel with the series-connected first and second capacitors 111 and 112. The junction of the first and second capacitors 111 and 112 and the junction of the first and second switches 113 and 114 are individually connected to the primary side of the transformer 120, and voltages at respective junctions are input to the primary side depending on the switching of the first and second switches 113 and 114. The switching of the first and second switches 113 and 114 is controlled by the PWM control unit 150, which will be described later. Preferably, the half-bridge circuit unit 110 of the present invention receives the input voltage across the P-N buses, converts the input voltage into a voltage corresponding to ½ of the input voltage, and outputs the resulting voltage.

The transformer 120 transfers the primary side voltage, output from the half-bridge circuit unit 110, to the secondary side thereof. Such an output voltage on the secondary side is determined according to the internal turns ratio of the transformer 120. Preferably, the secondary side output voltage is output as a low voltage, which is much lower than the primary side voltage.

The DC/DC converter 130 converts the secondary side output voltage of the transformer 120 into the voltage required for the sub-modules. In this way, the voltage supplied to the sub-modules is obtained by converting the input voltage that is a high voltage across the P and N buses into a low voltage using the half-bridge circuit unit 110, and converting the low voltage into a voltage that is even lower than the low voltage through the transformer 120.

The photocoupler 140 detects the output voltage on the secondary side of the transformer 120. In the photocoupler 140, the primary side and the secondary side of the transformer 120 are electrically isolated from each other, and thus current corresponding to the secondary side output voltage of the transformer 120 is supplied to a light-emitting unit, so that light is emitted. A light-receiving unit receives the light emitted from the light-emitting unit, and then outputs a reference signal corresponding to the secondary side voltage. In this way, the photocoupler 140 provides the reference signal corresponding to the secondary side output voltage to the PWM control unit 150, which will be described later. By means of this, the PWM control unit 150 operates the half-bridge circuit unit 110 using the corresponding reference signal.

The PWM control unit 150 controls the switching of the switches 113 and 114 in the half-bridge circuit unit 110. Here, the PWM control unit 150 calculates the ON/OFF switching duty ratio of the switches 113 and 114 using the reference signal corresponding to the secondary side output voltage supplied from the photocoupler 140, and varies the width of the switching pulse for the switches 113 and 114 depending on the calculated switching duty ratio. In particular, in the present embodiment, the PWM control unit 150 is started in response to a starting voltage initially supplied from the starting circuit unit 160, which will be described later, and thus the PWM control unit 150 controls the switching of the first and second switches 113 and 114 of the half-bridge circuit unit 110. By this switching, a voltage corresponding to ½ of the input voltage is supplied to the primary side of the transformer 120 through the half-bridge circuit unit 110, and a relatively low voltage is output from the secondary side. In this case, the low voltage output from the secondary side of the transformer 120 is supplied as an operating voltage. In this way, during initial startup, the PWM control unit 150 receives a starting voltage from the starting circuit unit 160, and uses the output voltage on the secondary side, to which the voltage is input, as operating power when the voltage is input to the secondary side of the transformer 120 after startup. Here, in order for the PWM control unit 150 to use the secondary side output voltage of the transformer 120 as the operating power, it is preferable for the secondary side output voltage to normally be output as a preset voltage. That is, in order to be used as the operating power, a voltage having a predetermined magnitude or more is required. When the secondary side output voltage is normally output as the voltage having the preset magnitude or more, the secondary side output voltage is used as the operating power for the PWM control unit 150.

The starting circuit unit 160 supplies an initial starting voltage to the PWM control unit 150. In particular, in the present embodiment, the starting circuit unit 160 does not supply the starting voltage to the PWM control unit 150 until the input voltage reaches the starting voltage of the PWM control unit 150 after increasing from 0 V, and then supplies the starting voltage to the PWM control unit 150 when the input voltage further increases and reaches the starting voltage, with the result that the PWM control unit 150 starts to be operated. The startup of the PWM control unit 150 corresponds to the startup of the power control apparatus 100 according to the present invention.

Such a starting circuit unit 160 includes a B contact switch 161, a resistor 162, a voltage-drop diode 163, and a Zener diode 164.

The B contact switch 131 controls the flow of current generated by the input voltage across the P and N buses of the MMC. That is, since the B contact switch 131 is initially in a closed state, a line is shorted, and then current flows through the B contact switch. Thereafter, when the secondary side output voltage of the transformer 120 is applied, the B contact switch is opened, thus blocking the flow of current.

The resistor 162 is connected in series with the B contact switch 161, and limits the magnitude of current flowing through the B contact switch 161.

The voltage-drop diode 163 is connected in series with the resistor 162 and is configured to, when a voltage higher than a preset voltage is induced, allow the current to flow through the voltage-drop diode 163. That is, the voltage-drop diode 163 blocks the current when the input voltage is lower than the preset starting voltage of the PWM control unit 150, and allows the current to flow therethrough only when the input voltage is higher than the starting voltage. Such a voltage-drop diode 163 may include, for example, a Transient Voltage Suppressor (TVS) diode.

The Zener diode 164 is connected in series with the voltage-drop diode 163, and supplies a clamping voltage, generated using the current flowing through the voltage-drop diode 163, to the PWM control unit 150. The Zener diode 164 is configured to apply a constant voltage to the PWM control unit 150.

In this way, in the starting circuit unit 160 according to the present invention, since the B contact switch 161 is in a closed state upon initial operation, the line is shorted, and then current flows through the B contact switch. Here, the input voltage across the P and N buses increases from 0 V to a preset maximum voltage (Vmax), wherein the current flowing through the B contact switch 161 is blocked by the voltage-drop diode 163 until the input voltage reaches the starting voltage of the PWM control unit 150 after increasing from 0 V. That is, as described above, the voltage-drop diode 163 allows current to flow therethrough only when the input voltage is equal to or higher than the starting voltage.

Thereafter, when the input voltage continues to increase and reaches the starting voltage of the PWM control unit 150, the voltage-drop diode 163 allows the current to flow therethrough, so that a clamping voltage is applied across the two ends of the Zener diode 164 and is then applied to the PWM control unit 150. The voltage applied in this way is the starting voltage of the PWM control unit 150.

Below, the operation of the power control apparatus for MMC sub-modules according to the embodiment of the present invention will be described in detail with reference to FIGS. 4 to 7. FIGS. 4 to 7 are diagrams illustrating control flow depending on the operation of the power control apparatus 100 according to the embodiment of the present invention.

Figure 4:
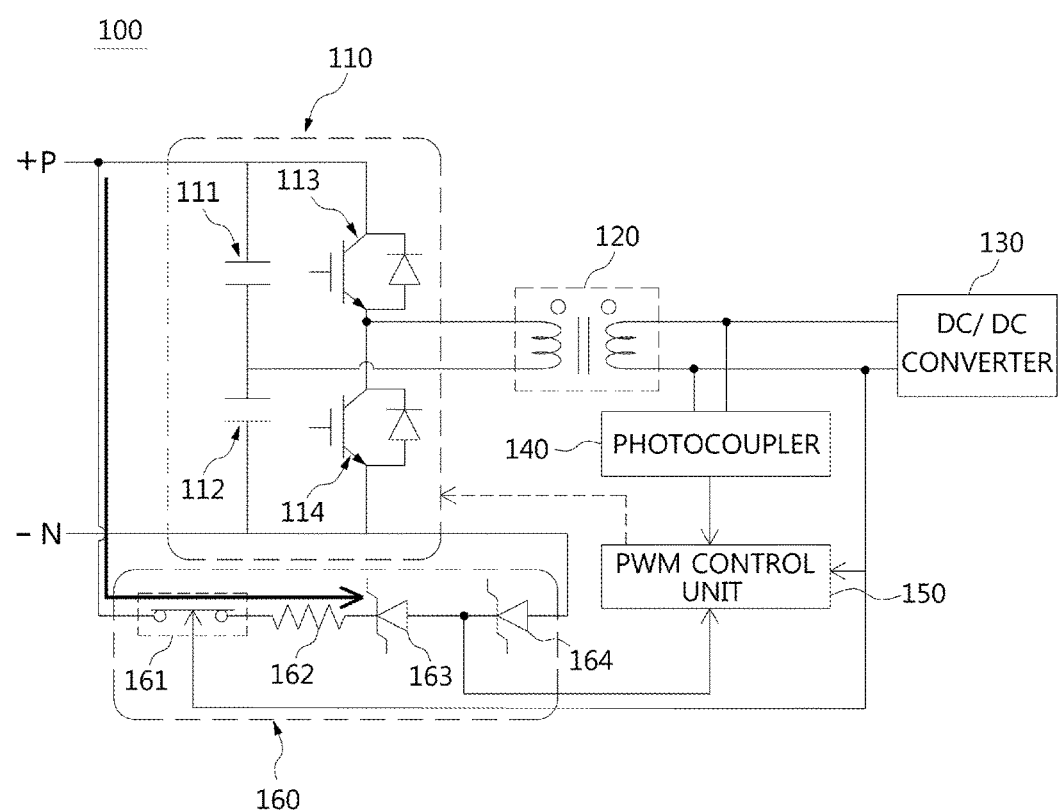
FIGS. 4 to 7 are diagrams illustrating current flow depending on the operation of a power control apparatus 100 according to an embodiment of the present invention.

As shown in an example of FIG. 4, an input voltage across the P and N buses starts to increase from 0 V. In an initial stage, the B contact switch 161 of the starting circuit unit 160 is shorted, and thus the current corresponding to the input voltage flows into the voltage-drop diode 163 through the B contact switch 161 and the resistor 162. However, since current flows through the voltage-drop diode 163 only when a voltage equal to or higher than a preset voltage is applied to the voltage-drop diode 163, the present embodiment is set such that current flows through the voltage-drop diode only when a voltage equal to or higher than the starting voltage, which is required for the starting of the power control apparatus 100, that is, the PWM control unit 150, is induced. Thus, current does not flow through the voltage-drop diode 163 in a low-voltage area in which the input voltage is lower than the starting voltage. As a result, since current does not flow through the Zener diode 164 in FIG. 5, the voltage across the two ends of the Zener diode 164 becomes 0 (zero) voltage, and thus no voltage is applied to the PWM control unit 150. In this case, the power control apparatus 100 is not started. That is, until the input voltage reaches the preset starting voltage after increasing from 0 V, the PWM control unit 150 is not started, and thus the power control apparatus 100 is not started either. Therefore, zero (0) voltage is applied to the PWM control unit 150, and the switches of the half-bridge circuit unit 110 are not operated, thus preventing voltage from being output from the secondary side of the transformer 120.

Figure 5:
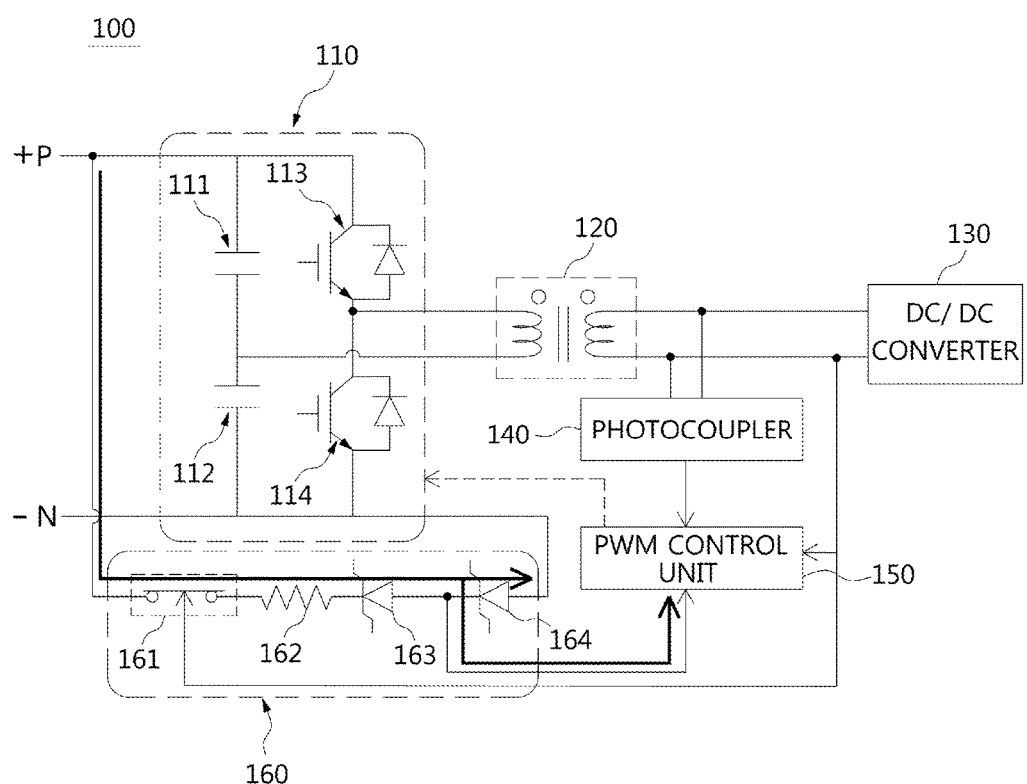

Referring to an example of FIG. 5, when the input voltage continues to increase and reaches the starting voltage required to start the PWM control unit 150, current flows through the voltage-drop diode 163, and thus the current flowing through the B contact switch 161 and the resistor 162 is applied to the Zener diode 164, and the clamping voltage of the Zener diode 164 is applied as the starting voltage to the PWM control unit 1150. In this way, when the starting voltage is applied to the PWM control unit 150, the PWM control unit 150 switches the switches 113 and 114 of the half-bridge circuit unit 110.

Figure 6:
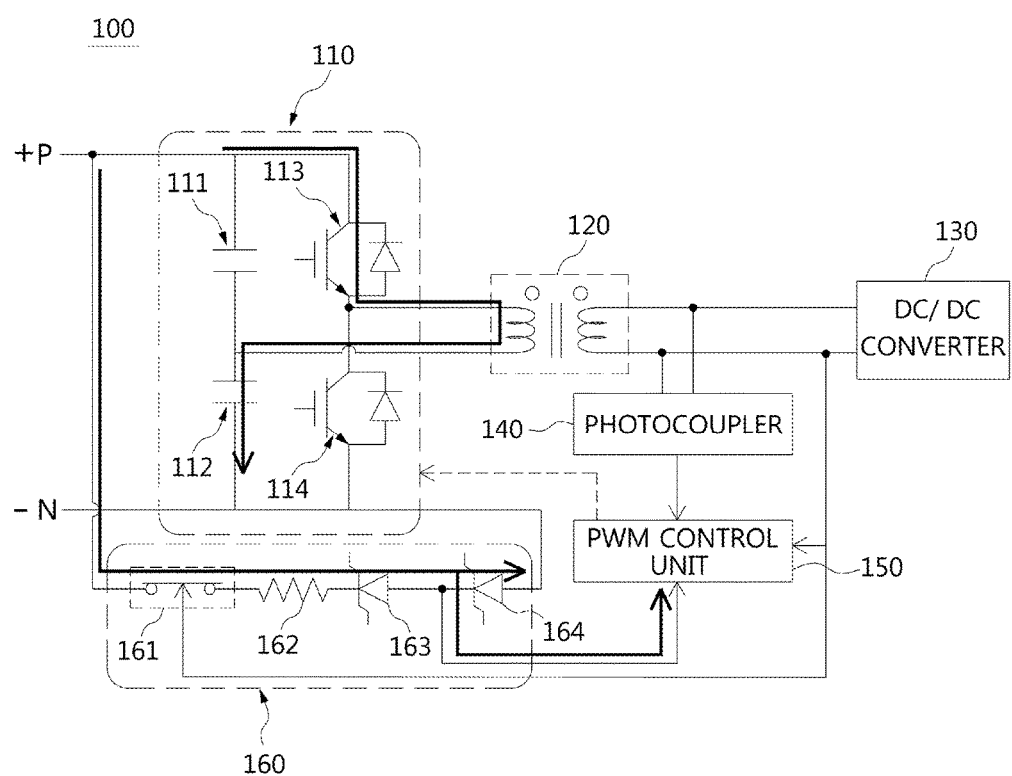

In an example of FIG. 6, when the switches 113 and 114 of the half-bridge circuit unit 110 are operated, current flows into the transformer 120. In this way, the output voltage of the half-bridge circuit unit 110 is applied to the primary side of the transformer 120, and is then transferred to the secondary side of the transformer 120. The voltage converted depending on the turns ratio of the transformer is output through the secondary side of the transformer 120. Such a secondary side output voltage is individually supplied to the DC/DC converter 130, the PWM control unit 150, and the starting circuit unit 160. In this case, the secondary side output voltage supplied to the PWM control unit 150 is used as operating power for the PWM control unit 150, and the B contact switch 161 is operated in response to the secondary side output voltage, which is supplied to the starting circuit unit 160, and is then switched to be opened.

Figure 7:
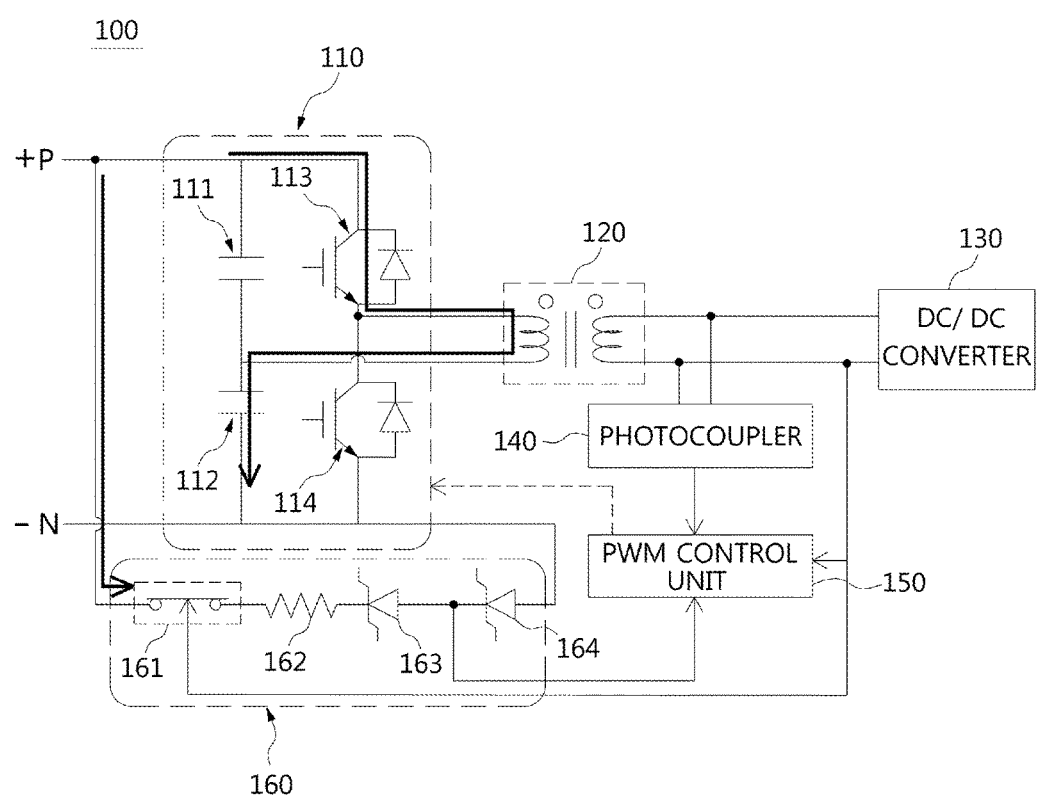

In an example of FIG. 7, the flow of current in the state in which the B contact switch 161 is opened is illustrated. In the state in which the B contact switch 161 is opened, current is blocked by the B contact switch 161, so that voltage is not applied to the PWM control unit 180 any longer, and only the secondary side output voltage of the transformer 120 is supplied as an operating voltage to the PWM control unit 150. Accordingly, the PWM control unit 150 operates the power control apparatus 100 using the operating voltage. Therefore, the starting circuit unit 160 starts the PWM control unit 150 by supplying the starting voltage to the PWM control unit 150, and thereafter the starting circuit unit 160 stops the operation thereof when the voltage is output from the secondary side of the transformer 120. At this time, the PWM control unit 150 does not receive the voltage from the starting circuit unit 160 any longer, receives the secondary side output voltage of the transformer 120, and uses the secondary side output voltage as operating power.

As described above, the power supply apparatus 100 for MMC sub-modules according to the present invention starts the PWM control unit 150 only when the input voltage is equal to or higher than the starting voltage required to start the PWM control unit 150, and uses the voltage output from the secondary side of the transformer 120 as operating power for the PWM control unit 150 when the PWM control unit 150 is started and a normal voltage is output from the secondary side of the transformer 120. In this way, the generation of heat and the occurrence of loss in resistors and a Zener diode, which are presented as the problem with the conventional technology, may be minimized.

In the above description, although a description has been made such that all components constituting embodiments of the present invention are combined into a single component or are operated with the components being combined with each other, the present invention is not limited to those embodiments. That is, within the scope of the present invention, one or more of all components may be selectively combined and operated. Further, it should be understood that terms such as "comprise", "include" or "have" are merely intended to indicate that the corresponding component is internally present, unless a description to the contrary is specifically pointed out in context, and are not intended to exclude the possibility that other components may be additionally included. Unless differently defined, all terms used here including technical or scientific terms have the same meanings as the terms generally understood by those skilled in the art to which the present invention pertains. The terms identical to those defined in generally used dictionaries should be interpreted as having meanings identical to contextual meanings of the related art, and are not interpreted as being ideal or excessively formal meanings unless they are definitely defined in the present specification.

The above description is merely intended to exemplarily describe the technical spirit of the present invention, and those skilled in the art will appreciate that various changes and modifications are possible without departing from the essential features of the present invention. Therefore, the embodiments disclosed in the present invention are not intended to restrict the technical spirit of the present invention and are merely intended to describe the present invention, and the scope of the present invention is not limited by those embodiments. The protection scope of the present invention should be defined by the accompanying claims, and all technical spirit of equivalents thereof should be construed as being included in the scope of the present invention.

The invention claimed is:

1. A power control apparatus for sub-module of a Modular Multilevel Converter (MMC), comprising:
   a half-bridge circuit unit for switching multiple switches, converting an input voltage across P and N buses of the MMC into a relatively low voltage, and outputting the low voltage;

a transformer for transferring the low output voltage (primary side), output through switching of the switches in the half-bridge circuit unit via switching of the switches, to a secondary side of the transformer;

a DC/DC converter for converting an output voltage on the secondary side of the transformer;

a photocoupler for outputting a reference signal corresponding to a magnitude of the secondary side output voltage of the transformer;

a Pulse Width Modulation (PWM) control unit for controlling switching of the switches in the half-bridge circuit unit in response to the reference signal output from the photocoupler; and a starting circuit unit for supplying an initial starting voltage to the PWM control unit, wherein the PWM control unit is started in response to the starting voltage initially supplied from the starting circuit unit, and is configured to control switching of the switches in response to the reference voltage received from the photocoupler, and to receive the secondary side output voltage of the transformer as an operating voltage depending on the switching, thus being operated.

2. The power control apparatus of claim 1, wherein the input voltage increases from 0 V to a preset maximum voltage (Vmax).

3. The power control apparatus of claim 2, wherein the starting circuit unit is configured to, when the input voltage initially increases and reaches a preset starting voltage of the PWM control unit, supply the starting voltage to the PWM control unit, and when the secondary side output voltage of the transformer is normally output as a preset voltage, receive the secondary side output voltage and block a supply of power to the PWM control unit.

4. The power control apparatus of claim 3, wherein the starting circuit unit comprises:

a B contact switch configured to allow current corresponding to the input voltage to flow therethrough or to block the flow of the current;

a resistor connected in series with the B contact switch and configured to limit a magnitude of the current;

a voltage-drop diode connected in series with the resistor and configured to, when a voltage higher than the preset voltage is induced, allow the current to flow through the voltage-drop diode; and a Zener diode connected in series with the voltage-drop diode and configured to apply a constant voltage to the PWM control unit.

5. The power control apparatus of claim 3, wherein the B contact switch is maintained in a shorted state until the input voltage reaches the preset starting voltage, and is switched to an opened state when the secondary side output voltage of the transformer is applied.

6. The power control apparatus of claim 1, further comprising a current-limiting circuit for preventing current equal to or higher than a preset reference current from being applied to the half-bridge circuit unit.

7. The power control apparatus of claim 1, wherein the PWM control unit calculates a switching duty ratio of the switches using the secondary side output voltage and an output current and varies a width of a switching pulse for the switches depending on the calculated switching duty ratio.

* * * * *